Patented Nov. 24, 1925.

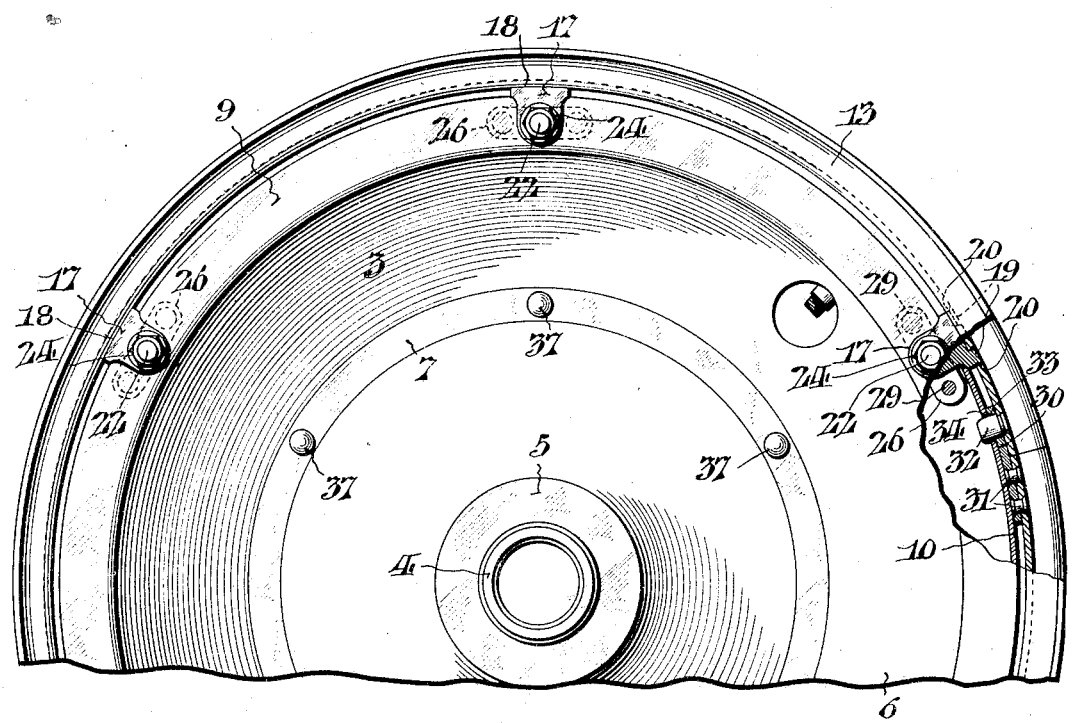
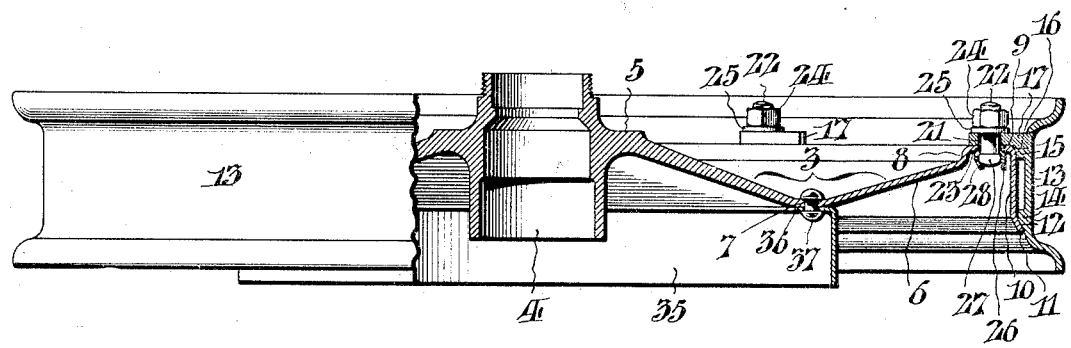

1,563,114

UNITED STATES PATENT OFFICE.

JOHN W. SMITH, OF PHILADELPHIA, PENNSYLVANIA.

VEHICLE WHEEL.

Application filed April 3, 1923. Serial No. 629,584.

*To all whom it may concern:*

Be it known that I, JOHN W. SMITH, a citizen of the United States, residing at Philadelphia, in the county of Philadelphia and State of Pennsylvania, have invented certain new and useful Improvements in Vehicle Wheels, of which the following is a specification, reference being had to the accompanying drawings.

This invention relates to vehicle wheels and it has more particular reference to that form or type commonly known in the trade as disk wheels, the same usually comprising a web portion with a removably attached hub, and a fixed or demountable rim. Many disadvantages inhere to the construction of disk wheels as heretofore accomplished but one noteworthy of consideration is, that considerable time and labor are unnecessarily involved in the machining of the detachable hub and its connecting members to ensure a perfect fit, while there is an obvious excess of weight and reduction in diametric strength due to the piercing of said disk for a friction fit of the bolts or other fastening means employed. The primary object of this invention is to overcome the aforesaid disadvantages by making the web and hub portions as an integral unit, and providing said web with a seat for the brake drum, thereby effecting a very material reduction in weight while providing a stronger and more durable structure.

Another object of this invention is to furnish, what may be conveniently termed, a one-piece hub-and-disk component for standard makes of vehicle wheels.

A further object of this invention is to provide a disk component of the type referred to having an associated detachable rim embodying novel structural features.

With the foregoing and other objects in view my invention consists in certain novel features of construction, combinations and arrangements of parts hereinafter fully described, and more specifically particularized by the subjoined claims.

In the further disclosure of the invention reference will be had to the accompanying sheet of drawings constituting a part of this specification and in which like characters of reference designate the same parts in both views.

Figure I is a diametric or semi-side view of a vehicle wheel embodying my present invention with fragments broken away or in section for a clearer view of underlying portions; and Figure II is an axial transverse section of the same.

Referring more in detail to the drawings which illustrate, by way of example only, the adaptation of my invention to a demountable rim wheel for vehicular use, the unitary wrought metal disk-and-hub member is hereafter generally characterized by the numeral 3, and it is noteworthy at this juncture that said unitary member is produced in accordance with the method forming the subject matter of my companion and co-pending application, Serial Number 629,585. This unitary member 3 comprises a hub 4, having a surrounding flange 5 intermediate its ends, and said flange 5 merges into a conically dished concentric web 6, of gradually decreasing gage having a co-axial seat 7, for a purpose hereafter explained. The outer part of the conically dished web 6, is suitably draw-pressed and beaded or fileted at 8, to provide an annular flat portion 9 disposed in a plane at right angles to the axis of the hub 4, with an annular peripheral flange or rim 10 which is outwardly flared at 11 to constitute a rim locating seat 12.

The demountable rim 13 in accordance with this invention is rolled or otherwise fashioned in cross-section to provide a plurality of locating annular and inwardly directed flanges or ribs 14, 15, the former, 14, of which is appropriately beveled to frictionally and evenly engage the aforesaid rim locating seat 12, while the latter flange or rib 15 is shaped at 16 to similarly cooperate with the outer curved surface of the bead or filet 8 as will be clearly understood on an examination of Figure II. In order to provide a simple and effective means for securely attaching the demountable rim 13 to the aforesaid disk wheel member 3 I furnish the said rim 13 with a plurality of inwardly directed radial lugs 17 preferably of the configuration shown clearly in Figure I. Each lug 17 is arcuately curved at 18 to abut the inner peripheral surface of the rim 13, and likewise it is formed with outwardly directed projections 19 for riveting or clinching into correspondingly shaped holes or apertures 20 provided for the purpose in said rim. These lugs 17 are apertured at 21 for the passage of bolts 22 inserted through registering holes 23 in the hereinbefore referred to annular flat portion 9 of the wheel disk member 3, and each said bolt 22 is provided with a nut 24 and lock washer 25. To establish a simple means for reinforcing the portion 9 around the holes 23, as well as preventing the bolts 22 from lateral or rotary movement, I interpose a channeled clip 26 between the head 27 of each said bolt 22 and the abutting face of the annular portion 9, with one of the clip flanges bent over or clinched at 28 after the bolt 22 is inserted, as clearly visible in Figure II. These reinforcing clips 26 may be secured to the annular portion 9 by riveting as indicated at 29 in Figure I; or, they may be spot welded or otherwise immovably fixed in place, as will be perfectly obvious to those conversant with the sheet metal trades.

Referring once again to the demountable rim 13, it will be noted that it is suitably beaded or rolled around its edges in conformity with the generally accepted designs to accommodate the usual tire shoe—not shown—while the abutting ends are connected by means of a tongue plate 30, rigidly secured by rivets 31 to one end of said rim 13. The abutting end of the demountable rim 13 has secured thereto by riveting or otherwise a stud 32, arranged for easy passage through a corresponding hole 33 in the tongue plate 30 and a registerable hole 34 in the disk peripheral flange or rim 10, as clearly shown in Figure I. Thus it will be seen that the stud 32 serves the dual purpose of connecting the abutting ends of the demountable rim in aligned relation as well as effectively locking said rim 13 to the peripheral flange 10. It is particularly noteworthy at this point, that with a demountable rim 13 constructed and assembled as hereinbefore set forth I am enabled to dispense entirely with the usual wedging ring interposed between the peripheral flange 10 and said rim 13, thereby reducing the weight as compared with prevailing patterns of disk wheels. Said feature I deem of much importance, and it will be perfectly obvious that the inwardly directed annular flanges 14, 15 respectively seating at 12 and 16 as previously described, will ensure proper registration of the parts 3 and 13, while they also effectively prevent any tendency to buckling or displacement consequent upon—or resulting from—the abnormal torsional strains and shocks incident to rough usage.

To further add to the lightness of my novel vehicle wheel I form the customary brake drum 35 with an inwardly turned integral flange 36 of appropriate dimensions to snugly fit the co-axial seat 7 on the conically dished web 6 of the disk component 3, and connect said brake drum 35 thereto by rivets 37, or any other appropriate means that will secure an immovable connection.

Thus it will be seen that by means of the foregoing constructive connection I eliminate, almost entirely, the excess weight of a brake drum supporting diaphragm ordinarily extending to the wheel hub, while the strength of the complete structure is in no respect impaired.

From the foregoing description the assembly and dismantling of my novel disk wheel will be perfectly clear without further explanation, while its inherent advantages will be obvious to anyone ordinarily conversant with the art, therefore further description is deemed unnecessary. As heretofore pointed out the embodiment illustrated and particularly described is by way of example only, hence the right is therefore reserved to make such changes or variations in the design of my invention as fairly lie within the scope of the appended claims, for example I may dispense with the demountable rim 13 and shape the peripheral flange or rim 10 in conformity with the well known clincher design, the same thereby providing a neat construction of wheel for cheap cars.

Having thus described my invention, I claim:

1. The combination in a vehicle wheel of a one-piece wrought metal disk having an integrally formed hub and peripheral flange, a demountable rim, means connecting the demountable rim rigidly to the one-piece disk, and means for seating a brake drum concentrically on the aforesaid disk.

2. A vehicle wheel comprising a one-piece wrought metal disk having an integral hub with a surrounding web of outwardly diminishing and reinforced radial section, said web having its outer portion shaped to provide a peripheral flange adapted to locate a demountable tire rim, and means for seating a brake drum concentrically on the aforesaid disk.

3. A vehicle wheel comprising a one-piece wrought metal disk having an integral hub with a medial surrounding web of outwardly diminishing and reinforced radial section, said web having its outer portion shaped into demountable rim receiving cross-section, and means for seating a brake drum concentrically on the aforesaid disk.

4. A vehicle wheel comprising a one-piece wrought metal disk including an integral hub with a medial surrounding dished web of outwardly diminishing gage, said web having its peripheral portion shaped to provide a reinforced rim seating portion, and means for seating a brake drum concentrically on the aforesaid disk.

5. A vehicle wheel comprising a one-piece wrought metal disk including an integral hub with a surrounding medially disposed web of conically dished and radially diminishing gage, said web having its peripheral portion flanged and flared to provide a rim locating seat, and means for seating a brake drum concentrically on the aforesaid disk.

6. A vehicle wheel comprising a one-piece wrought metal disk including an integral hub with a surrounding medially disposed web, conically dished and of radially diminishing gage, said web having its peripheral portion flanged and flared to provide a rim locating seat, and an annular seat intermediate the hub and flanged periphery for the connection thereto of a brake drum.

In testimony whereof, I have hereunto signed my name at Philadelphia, Pennsylvania, this 27th day of March 1923.

JOHN W. SMITH.